C. FENDEIS.
RESILIENT TIRE.
APPLICATION FILED SEPT. 8, 1913.
1,110,538.
Patented Sept. 15, 1914.
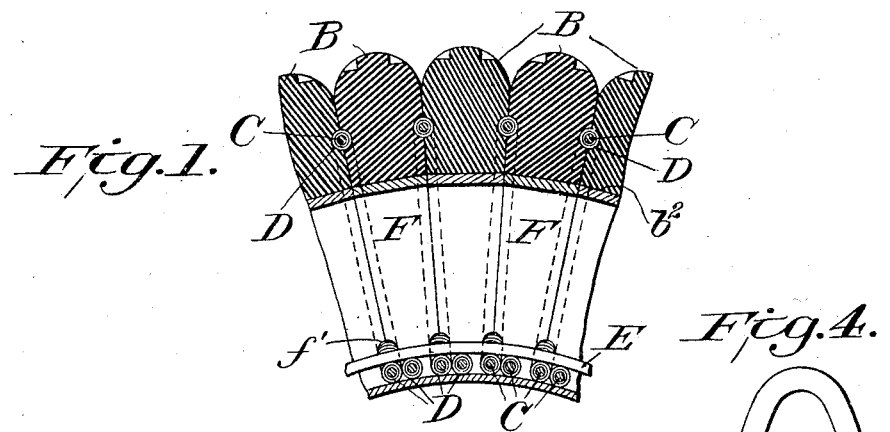
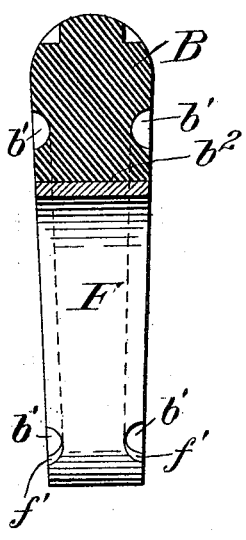
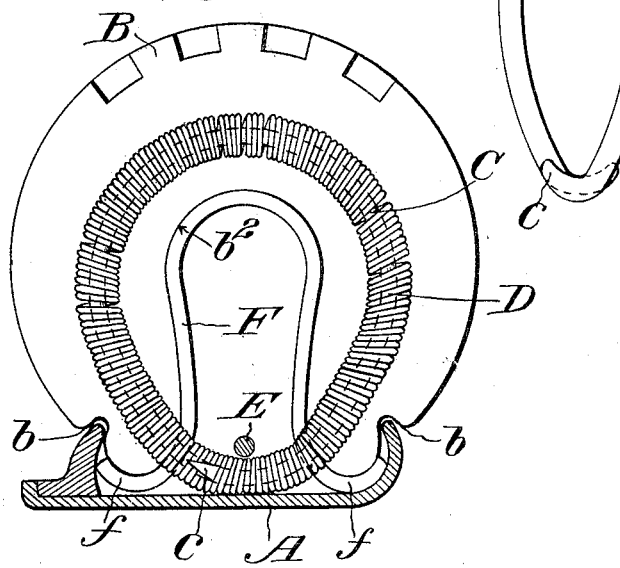
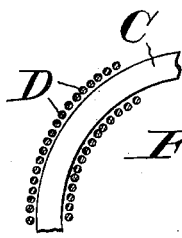
Inventor,
Charles Fendeis.
Witnesses
C. H. Walker.
Chas. E. Riorda
By Frederick V. Winters,
His Attorney,

UNITED STATES PATENT OFFICE.

CHARLES FENDEIS, OF NEW YORK, N. Y.

RESILIENT TIRE.

1,110,538.  Specification of Letters Patent.  Patented Sept. 15, 1914.

Application filed September 8, 1913. Serial No. 788,668.

*To all whom it may concern:*

Be it known that I, CHARLES FENDEIS, a citizen of the United States, residing at New York, in the county and State of New York, have invented certain new and useful Improvements in Resilient Tires, of which the following is a full, clear, and exact specification.

This invention relates to resilient tires of the sectional type, and has for its object to provide a durable tire of this kind having good elasticity or resiliency and which is inexpensive to manufacture.

Other objects will become apparent as the description proceeds.

The invention will be first hereinafter described in connection with the accompanying drawings, which constitute a part of this specification, and then more specifically set forth in the claims at the end of the specification.

In the accompanying drawings, in which similar reference characters are used throughout the several views to designate corresponding parts: Figure 1 is a central longitudinal section of a portion of a tire constructed in accordance with my invention. Fig. 2 is a transverse section of the same on a larger scale. Fig. 3 is an enlarged detail section of one of the tire sections, one of the bowed supporting springs being also shown and the notches in both being more clearly illustrated than in Fig. 1. Fig. 4 is a detail perspective view of one of the metal rings which are placed between the tire sections, the spring sleeve for said ring being removed, and Fig. 5 is a detail view of a part of one of the rings and its spring sleeve, the latter in section.

Referring more particularly to the drawings, A designates a wheel rim of ordinary construction and having its flanges engaging notches $b$ in the tire sections B. These tire sections conform generally to the shape of the usual tire but have recesses $b^2$ on the interior and grooves $b'$ in the sides. The tire sections are slightly wedge-shaped, as shown in Fig. 3, in order that when said sections are placed side by side transversely of the rim, they will make up a complete tire, as will be readily understood.

Arranged intermediate of the tire sections and seated in the grooves $b'$ therein are metal rings C bearing coiled wire sleeves D. The ends of the rings C overlap and project from the sleeves, as at $c$, Fig. 2, on the inner surface of the tire next to the rim. These sleeved rings are held to the rim by a suitable band E passed through all the rings and entirely around the rim. When all the sections B are put in place alternating with the sleeved rings C, said sections are retained in place by the engagement of said rings with the grooves $b'$. The load or weight of a vehicle on the tire will compress the portion of said tire which is in contact with the road and cause the ends of the rings C to move outwardly in opposite directions to some extent. Further resiliency is given the tire by employing bowed springs F which are placed in and conform to the recesses in the sections B, as clearly illustrated in Figs. 2 and 3. The ends $f$ of these springs are turned outward below the inner portions of the sections B and rest upon the rim. The width of the springs F may correspond with the width of the sections of the tire, and said springs may be provided with notches $f'$ alined with the ends of the grooves $b'$ in said sections, see Fig. 3, so as not to interfere with the proper placing and operation of the sleeved rings C.

Having thus described my invention, what I claim as new and desire to secure by Letters Patent of the United States is:

1. In a resilient tire, the combination with a plurality of transverse tire sections having grooves in their abutting faces, of metal rings arranged in said grooves and having their ends overlapped at the inner face of the tire, and a resilient sleeve for each of said rings.

2. In a resilient tire, the combination with a plurality of transverse tire sections having interior recesses opening on the inner face of the tire, said sections also having grooves in their abutting faces, of bowed springs fitted in said recesses, and metal rings arranged in said grooves, said bowed springs being arranged alternately with said rings.

3. In a resilient tire, the combination with a plurality of transverse tire sections having interior recesses opening on the inner face of the tire, of bowed springs fitted in said recesses and having their ends turned out under the inner portions of the tire sections, said sections and springs having alined grooves and notches respectively in their abutting faces, and separate interlocking means arranged in said alined grooves and notches.

4. In a resilient tire, the combination with a plurality of transverse tire sections having interior recesses opening on the inner face of the tire, of bowed springs fitted in said recesses and having their ends turned out under the inner portions of the tire sections, said sections and springs having alined grooves and notches respectively in their abutting faces, metal rings arranged in said grooves and notches, and a band passed through said rings for binding them to a wheel rim.

In testimony whereof I have signed my name to this specification in the presence of two attesting witnesses.

CHARLES FENDEIS.

Witnesses:
 PIERRE M. CLEAR,
 FRANCIS JARVIS.

Copies of this patent may be obtained for five cents each, by addressing the "Commissioner of Patents, Washington, D. C."